P. SCHMITT.
CULTIVATOR AND WEEDER.
APPLICATION FILED FEB. 9, 1916.
1,258,711.
Patented Mar. 12, 1918.
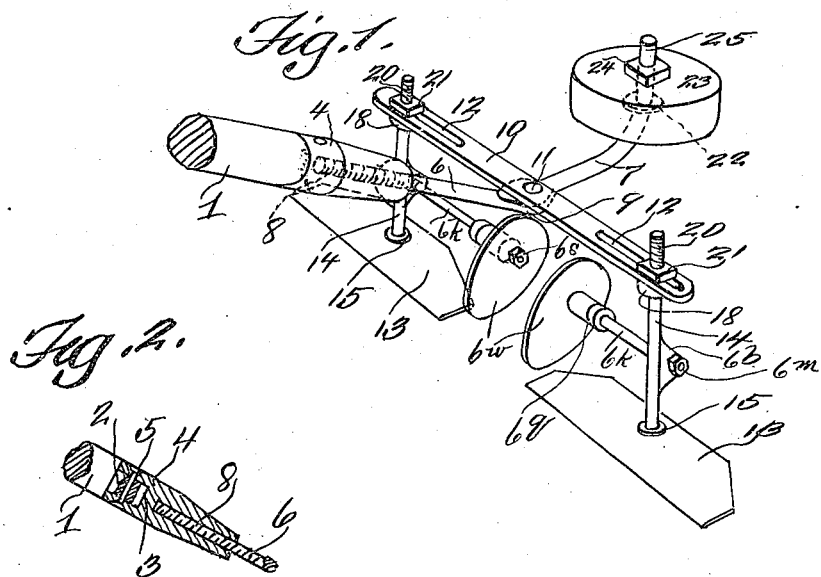
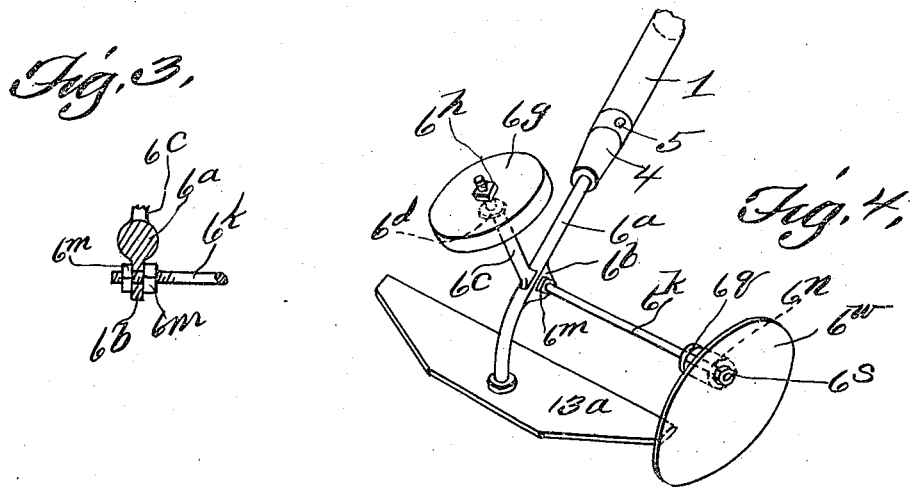

UNITED STATES PATENT OFFICE.

PHILIPP SCHMITT, OF PORT ORCHARD, WASHINGTON, ASSIGNOR OF TWO-FIFTHS TO THOMAS F. FOSTER, OF PORT ORCHARD, WASHINGTON.

CULTIVATOR AND WEEDER.

1,258,711.      Specification of Letters Patent.     Patented Mar. 12, 1918.

Application filed February 9, 1916. Serial No. 77,179.

*To all whom it may concern:*

Be it known that I, PHILIPP SCHMITT, a citizen of the United States, residing at Port Orchard, in the county of Kitsap, State of Washington, have invented a new and useful Cultivator and Weeder; and I do hereby declare the following to be a full, clear, and exact description of the invention, such as will enable other skilled in the art to which it appertains to make and use the same.

This invention relates to improved hand cultivating and weeding implement or tool, and an object of the invention is to improve, simplify, and render more efficient and practical the implement or tool set forth, shown in the drawings and claimed in the patent to Philipp Schmitt, No. 1,154,063.

Another object of the invention is to provide a device of this nature, in which improved features of construction are involved.

One of the features of the construction is the provision of a shank extending axially from the tool handle and provided with an upturned extremity, which is provided with a weight, to assist in holding the cutting blade below the surface of the soil, so that the blade will reach the roots of the weeds and the like.

Another feature of the invention is the provision of a transverse member secured upon the shank and provided at its opposite ends with elongated slots, in which the shanks of the cultivating and weeding blades are adjustably mounted for lateral adjustment.

Another feature of the invention is the provision of a guard, to prevent injury to the young plants, when weeding and cultivating.

In practical fields the details of construction may necessitate alterations, falling within the scope of what is claimed.

In the drawings:

Figure 1 is a view in perspective of the improved cultivating and weeding implement constructed in accordance with the invention.

Fig. 2 is a detail sectional view through the implement handle, showing how the shank is connected thereto.

Fig. 3 is a detail sectional view, showing how one of the rods 6ᵏ is secured to one of the ears 6ᵇ of one of the rods 14, or of the shank 6ᵃ of the implement in Fig. 4.

Fig. 4 is a detail view showing a hand operated cultivating or weeding implement illustrating a single blade and disclosing a clamp guard.

Referring to the drawings more especially 1 designates an implement handle, the lower forward end of which has a reduced part 2, which enters a socket 3 of the coupling 4, there being a rivet or the like 5, to secure the coupling 4 to the reduced extension 2. An implement shank 6 is provided, which is provided with a curved upwardly extending extremity 7 at one end, and having threads 8 at the other end, which is connected to the coupling 4, as shown clearly in Fig. 2. The shank 6 substantially midway the part 7 and the threaded end 8 has a flat portion 9, to which a transverse bar 10 is secured by a rivet 11, the body or shank of which is square or rectangular in cross section, in order to prevent the bar from turning. The opposite ends of the bar 10 are provided with elongated slots 12. Cultivating or weeding blades 13 are provided. The shanks or rods 14 of said blade adjacent their lower ends are provided with integral collars or annular plates 15 engaging the upper faces of the blades 13, there being extremities 16 rectangular in cross section, beyond the plates or collars 15, passing through the central parts of the blades 13, and are riveted as at 17 against and partially embedded in the under surfaces of the blades, thereby securely fastening the blades to the shanks or rods 14, to prevent the blades from turning. The blades 13 are arranged in a direction transversely of the shanks 6, and are alined with relation to each other. The upper parts of the shanks or rods 14 are provided with annular plates 18, which engage the under surface or face of the bar 10 adjacent the slots 12. Adjacent to but upwardly beyond the plates 18 on the rods 14 are rectangular portions 19, which correspond in size and fit the slots 12, to prevent rotation of the rods. The upper portions of the rods beyond the portions 14 are supplied with threads 20, to receive the nuts 21, so as to adjustably clamp the shanks or rods 14 in said slots 12. By this construction it is to be noted that the shanks or rods 14 may be adjusted laterally toward and from the implement shank 6, so that plants of different growths will pass between the adjacent ends of the blades 13, when using the instrument. When using the implement it is to be observed that by raising and lowering the implement handle 1, the cutting depth of the blades 13 may be varied. The curved extremity 7 is provided with an integral plate 22, against which the weight 23 (which constitutes means to weight the cutting blades 13 below the surface of the soil) is clamped, by virtue of the nut 24, which is threaded upon the threaded portion 25 of the extremity or part 7. In Fig. 4 the implement shank $6^a$ curves downwardly, and has a cutting blade $13^a$ secured thereto, in a manner similar to that shown at 15, 16 and 17 in the previous figures. The shank $6^a$ is provided with a downwardly extending ear $6^b$, and an upwardly and forwardly protruding extension $6^c$, against a plate $6^d$ of which a weight $6^g$ is clamped by a nut $6^h$. A laterally extending rod $6^k$ is clamped in the ear $6^b$ by the nuts $6^m$, which are threaded upon the rods $6^k$. This rod $6^k$ is in position above but in parallelism with the upper face of the blade $13^a$. Near the extremity (which is threaded at $6^n$) of the rod $6^k$ is an integral plate (which is annular) $6^q$, against which a plant guard $6^w$ (similar to that shown in said Patent No. 1,154,063) by means of a nut $6^s$. This guard constitutes means to prevent injury to the plants. Similar guards may be carried by lateral rods of the shanks or rods 14, and arranged between the adjacent ends of the cutting blades 13 in Fig. 1.

The invention having been set forth, what is claimed as new and useful is:

A hand cultivator implement, comprising a handle member having an implement shank at its lower end provided with an upturned extremity and having a flattened portion intermediate the upturned part and the lower end of the handle member, a bar fixed midway its ends to said flattened portion transversely of the implement shank, said bar having elongated slots in its opposite ends, vertical rods having their upper extremities threaded, and extending through said slots, means on the vertical rods above and below the bar for adjustably holding said rods adjustable in said slots, said vertical rods having cultivating or weeding blades at their lower ends, horizontal rods carried by said vertical rods and extending toward each other, guard members carried by the inner adjacent ends of the horizontal rods.

In testimony whereof I have signed my name to this specification in the presence of two subscribing witnesses.

PHILIPP SCHMITT.

Witnesses:
THOMAS F. FOSTER,
GEO. BLANCHARD.

Copies of this patent may be obtained for five cents each, by addressing the "Commissioner of Patents, Washington, D. C."